July 18, 1967  L. I. HALL  3,331,415

EGG SHELL PERFORATOR

Filed July 15, 1965

INVENTOR.
LEONARD I. HALL
BY
ATTORNEY

3,331,415
EGG SHELL PERFORATOR
Leonard I. Hall, 333 Rockingham,
Rochester, N.Y. 14620
Filed July 15, 1965, Ser. No. 472,174
4 Claims. (Cl. 146—2)

ABSTRACT OF THE DISCLOSURE

An egg shell perforator having a base with a centrally-disposed piercer, and a plurality of legs spaced around the piercer to form a flexible skirt for supporting an egg in registry with the piercer. The legs may be folded back on themselves.

---

Figure 1:
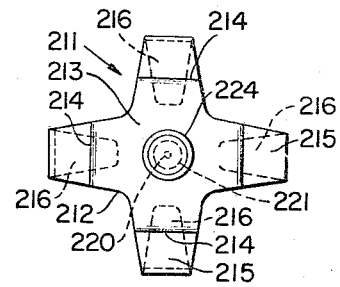

This invention relates to an egg perforator, and more particularly to a instrument for puncturing the shell of an egg to permit the escape of gas from the egg when it is boiled.

One of the most discouraging results of boiling an egg is that the shell, more often than not, cracks when the egg is placed in boiling water, so that the white of the egg leaks into the boiling water. This problem is particularly acute in the case where an egg is placed directly into boiling water, a practice which is commonplace when preparing soft boiled eggs. One reason for this is that the heat causes the gas within the eggshell to expand rapidly, thus not only cracking the shell, but also tearing the membrane, which lines the inside of the shell.

It is an object of this invention to provide an instrument for perforating, without cracking, the shell on an egg before it is boiled.

A more specific object of this invention is to provide an instrument for punching a small hole in an eggshell, and the membrane which lines the inside of the shell, to permit gas to escape from the shell during the boiling of the egg.

Another object of the invention is to provide a device of the character described which will be simple in construction, easy to use, and relatively inexpensive.

Other objects of the invention will be apparent hereinafter from the specification and from the recital of the appended claims, particularly when read in conjunction with the accompanying drawing.

Figure 2:
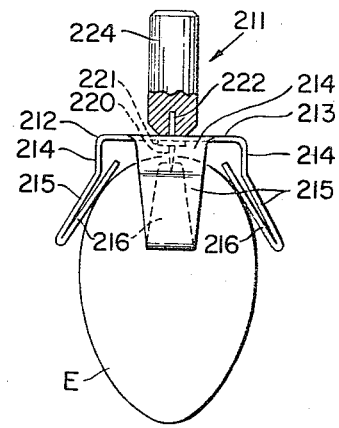

In the drawing:

FIG. 1 is a plan view of a perforator made in accordance with one embodiment of this invention; and FIG. 2 is an elevation of this perforator with a portion thereof cut away and shown in section, and showing the perforator disposed in operative position over an egg.

Referring now to the drawing by numerals of reference, perforator 211 comprises a plastic member 212, having a plane base portion 213, which is cross-shaped, and four, angularly spaced legs 214, which extend transversely downwardly from the base 213 at 90° intervals. Intermediate its ends (FIG. 14) each leg 214 is flared outwardly; and at its lower end each leg 214 is bent inwardly and upwardly as denoted at 216.

Projecting down from the underside of the base 213 centrally thereof is the pointed end of a tack-shaped member or piercer 220. Intermediate its ends member 220 has a circular flange or shoulder 221, which abuts the underside of the top 213; and at its upper end member 220 has an integral stem portion 222, which projects through the top 213, and is secured in the lower end of a handle 224.

In use, the end of the egg E, which is to be punctured, is held beneath the base 213, and is forced against the pointed end of the piercer 220. The member 212 is made from resilient plastic, so that the legs 214 tend to flex, as the egg E and piercer 220 are urged into operative, puncturing relation. Hence, the egg E is guided resiliently into engagement with the piercer; and as soon as the pressure is released following the puncturing of the eggshell, the legs 214 return to their original positions to help withdraw the piercer 220 from the shell. In addition, the resilient legs 214 tend to absorb any shock loading, which might tend to crack the eggshell accidentally.

Obviously many other modifications of the invention are possible. Thus, for instance, the handle 224 might be omitted from the device 211 and this device might then be inverted so that the base 213 can rest on a plane surface with the piercer 220 pointing upwardly, instead of downwardly. Then the egg can be pushed downwardly between the guide fingers or legs 216 to pierce it.

From the foregoing it will be apparent that applicant has devised a relatively simple, and inexpensive device for obviating an age-old problem encountered in the boiling of eggs. Applicant's perforator is extremely simple to use, and is so compact that it may be stored readily in any kitchen drawer.

While the invention has been described in connection with at least one embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. An egg shell perforator, comprising
    a base,
    a piercing member, which projects from said base substantially centrally thereof, and
    a flexible skirt on said base for supporting an egg in registry with said piercing member,
    said skirt comprising a plurality of flexible legs connected to said base at equi-angularly spaced points around the perimeter thereof, and projecting away from said base in the direction of said piercing member,
    each of said legs having a length substantially greater than the length of said piercing member.

2. An egg shell perforator, as defined in claim 1, wherein each of said legs has intermediate its ends a central portion, which flares outwardly from said base, and has adjacent its outer end a further portion, which is inclined rearwardly in overlapping relation with said central portion.

3. An egg shell perforator, as defined in claim 2, wherein
    said base is cross-shaped, and
    each of said legs is integral at its inner end with one of the four outer ends of the cross-shaped base.

4. An egg shell perforator, comprising,
    (a) a generally cup-shaped housing, and
    (b) a piercing element secured to the closed end of said housing and having a pointed end facing the open end of said housing,
    (c) said housing having around its open end a resilient skirt portion for supporting an egg in said open end in registry with said pointed end,
    (d) said skirt portion comprising a plurality of flexible legs projecting from said closed end at angularly spaced points thereabout, and
    (e) each of said legs having intermediate its ends a central portion, which flares outwardly from said closed end, and adjacent its outer end a further portion which is inclined rearwardly of said central portion and inwardly beneath said closed end.

References Cited

UNITED STATES PATENTS

| 2,224,941 | 12/1940 | Weimer | 146—2 |
| 2,676,631 | 4/1954 | Wood | 146—2 |
| 2,822,009 | 2/1958 | Haus | 146—2 |

FOREIGN PATENTS 180,503  1/1907  Germany.

WILLIAM W. DYER, Jr., *Primary Examiner.*